United States Patent
Oba

(10) Patent No.: US 12,052,139 B2
(45) Date of Patent: Jul. 30, 2024

(54) IMAGE FORMING SYSTEM USING NETWORK, IMAGE CONTROL APPARATUS, CONTROL METHODS THEREFOR, AND STORAGE MEDIA STORING CONTROL PROGRAMS THEREFOR

(71) Applicant: CANON KABUSHIKI KAISHA, Tokyo (JP)

(72) Inventor: Yoshitaka Oba, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/968,269

(22) Filed: Oct. 18, 2022

(65) Prior Publication Data

US 2023/0140919 A1    May 11, 2023

(30) Foreign Application Priority Data

Nov. 10, 2021 (JP) ................................ 2021-183415

(51) Int. Cl.
*G06F 15/00* (2006.01)
*G06F 3/12* (2006.01)
(Continued)

(52) U.S. Cl.
CPC ....... *H04L 41/084* (2013.01); *H04N 1/32793* (2013.01); *H04N 2201/0039* (2013.01); *H04N 2201/0044* (2013.01)

(58) Field of Classification Search
CPC ... H04L 41/084; H04L 41/12; H04N 1/32793; H04N 2201/0039; H04N 2201/0044; Y02D 10/00

See application file for complete search history.

(56) References Cited

U.S. PATENT DOCUMENTS 8,384,949 B2   2/2013 Ooba
10,038,815 B2 * 7/2018 Nakamura ......... H04N 1/00411
(Continued)

FOREIGN PATENT DOCUMENTS

JP    2009020810 A    1/2009

*Primary Examiner* — Thu V Nguyen
*Assistant Examiner* — Golam Mahmud
(74) *Attorney, Agent, or Firm* — ROSSI, KIMMS & McDOWELL LLP

(57) ABSTRACT

An image forming system that is convenient for a user even when an image forming apparatus is directly connected to a network in addition to an image control apparatus. The image forming system includes an image control apparatus and an image forming apparatus. The image control apparatus includes a first communication member connected to an external apparatus through a network, a second communication member connected to the image forming apparatus through a predetermined transfer path, and a port controller that controls switching of a predetermined network port of the first communication member. The image forming apparatus includes a third communication member connected to the external apparatus through the network, and a fourth communication member connected to the image control apparatus through the predetermined transfer path. The port controller closes the predetermined network port in a case where both of the third and fourth communication members are valid.

10 Claims, 10 Drawing Sheets

(51) Int. Cl.
   *H04L 29/08*   (2006.01)
   *H04L 41/084*  (2022.01)
   *H04N 1/32*    (2006.01)
   *H04N 1/327*   (2006.01)

(56) References Cited

U.S. PATENT DOCUMENTS

| | | | |
|---|---|---|---|
| 2003/0142352 A1* | 7/2003 | Matsunaga | G06F 3/1279 |
| | | | 358/1.15 |
| 2006/0117084 A1* | 6/2006 | Morozumi | H04N 1/32133 |
| | | | 709/203 |
| 2007/0143464 A1* | 6/2007 | Ooba | H04L 67/565 |
| | | | 709/223 |
| 2008/0052411 A1* | 2/2008 | Iwaki | H04L 12/4633 |
| | | | 709/245 |
| 2014/0368862 A1* | 12/2014 | Ooba | G06F 3/1279 |
| | | | 358/1.14 |
| 2015/0081757 A1* | 3/2015 | Yagi | H04L 67/62 |
| | | | 709/201 |
| 2017/0034391 A1* | 2/2017 | Nakamura | H04N 1/32598 |

* cited by examiner

IMAGE FORMING SYSTEM USING NETWORK, IMAGE CONTROL APPARATUS, CONTROL METHODS THEREFOR, AND STORAGE MEDIA STORING CONTROL PROGRAMS THEREFOR

BACKGROUND OF THE INVENTION

Field of the Invention

The present invention relates to an image forming system using a network, an image control apparatus, control methods therefor, and storage media storing control programs therefor.

Description of the Related Art

A system that consists of an image control apparatus and an image forming apparatus that are connected to a network is known as a conventional image forming system.

The image control apparatus is used to add a network printer function to the image forming apparatus and to extend the network printer function that the image forming apparatus has beforehand. The network printer function enables to print an image corresponding to an image signal input from an external apparatus through the network.

For example, Japanese Laid-Open Patent Publication (Kokai) No. 2009-20810 (JP 2009-20810A) discloses an apparatus that changes a way to display available functions of an image forming apparatus on an external apparatus connected to an image control apparatus through a network depending on a connection configuration between the image control apparatus and the image forming apparatus.

In the conventional image forming system, the image forming apparatus communicates an external network through the image control apparatus. Accordingly, the conventional technique does not necessarily cope with all cases. For example, in the image forming system using the conventional network transfer technology (NAT/NAPT), the image forming apparatus cannot perform communication using IPv6 or IPsec. This is because the network transfer technology implemented in the image control apparatus determines that such a communication is camouflage of a network packet.

That is, when the image forming apparatus communicates with an external apparatus using IPv6 or IPsec, it becomes impossible to use the conventional network transfer technology (NAT/NAPT), which needs to achieve a new scheme. Particularly, since IPsec is a technique that exchanges keys between an external apparatus and an image forming apparatus and finishes communication rapidly in finding camouflage of a network packet, it is an extremely useful technique when recent network security is taken into consideration.

If an image forming apparatus is also connected to a network in addition to an image control apparatus, a new scheme that enables transfer of a network packet between the image forming apparatus and an external apparatus using IPv6 or IPsec can be achieved.

However, such a system in which the image forming system is connected to the network in addition to the image control apparatus will be inconvenient for a user. For example, when an application of the external apparatus searches the network for an available apparatus, information about an image forming apparatus that is directly connected to the network and information about an image forming apparatus that is indirectly connected to the network through the image control apparatus will be detected. However, since these two pieces of information show the same image forming apparatus actually, the user may be confused.

SUMMARY OF THE INVENTION

The present invention provides an image forming system, an image control apparatus, control methods therefor, and storage media storing control programs therefor, which are convenient for a user even when an image forming apparatus is directly connected to a network in addition to an image control apparatus.

Accordingly, a first aspect of the present invention provides an image forming system including an image control apparatus and an image forming apparatus. The image control apparatus includes a first communication member configured to be connected to an external apparatus through a network, a second communication member configured to be connected to an image forming apparatus through a predetermined transfer path, and a port controller configured to control switching of a predetermined network port of the first communication member. The image forming apparatus includes a third communication member configured to be connected to the external apparatus through the network, and a fourth communication member configured to be connected to the image control apparatus through the predetermined transfer path. The port controller closes the predetermined network port in a case where both of the third and fourth communication members are valid.

According to the present invention, the image forming system, image control apparatus, control methods therefor, and storage media storing control programs therefor, which are convenient for a user even when an image forming apparatus is directly connected to a network in addition to an image control apparatus.

Further features of the present invention will become apparent from the following description of exemplary embodiments with reference to the attached drawings.

DESCRIPTION OF THE EMBODIMENTS

Figure 1:
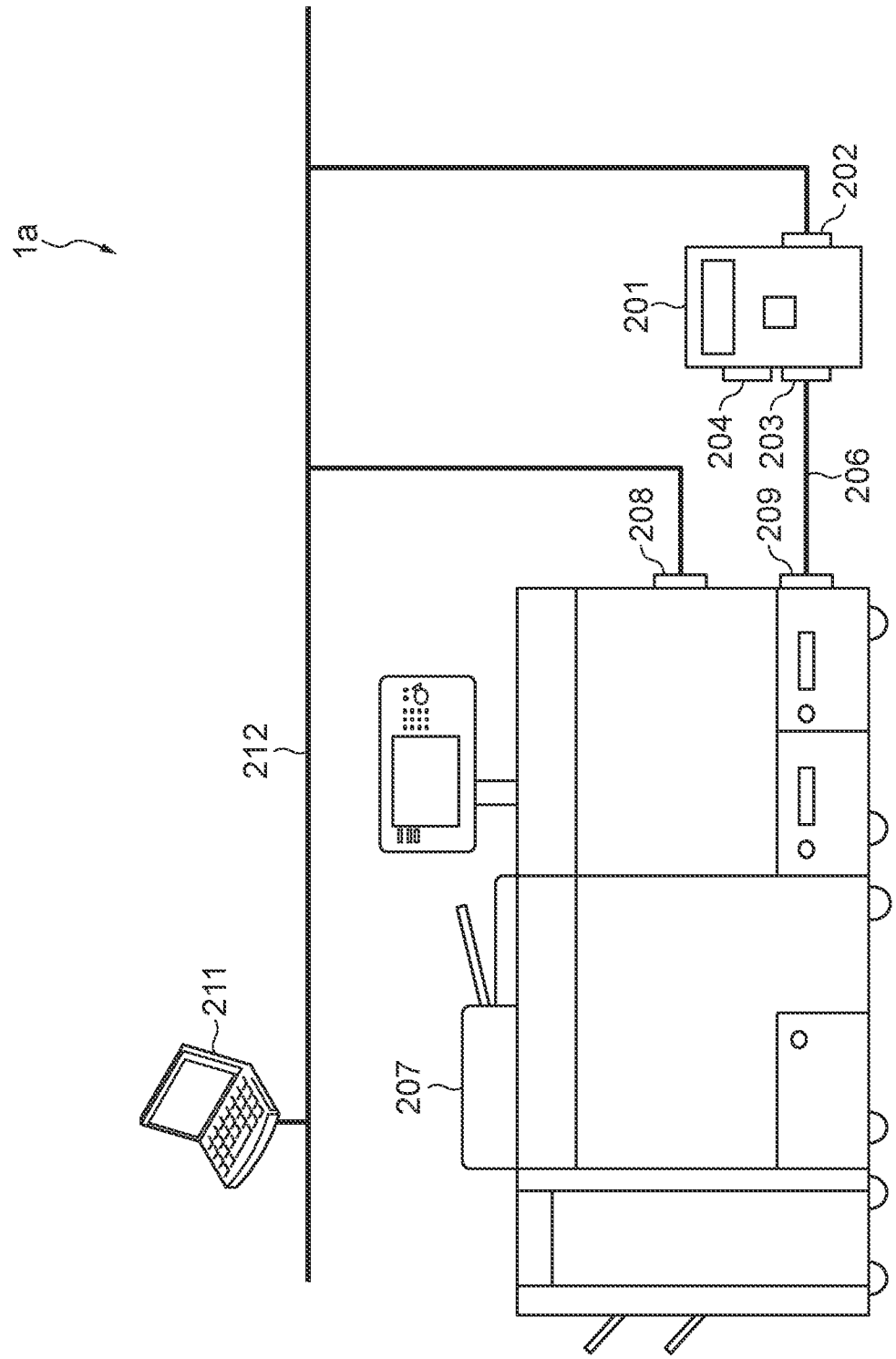
FIG. 1 is a schematic view showing a connection configuration of an image forming system of a first embodiment.

Hereafter, embodiments according to the present invention will be described in detail by referring to the drawings.

It should be noted that the following embodiments do not restrict the invention defined by the claims and not all combinations of characteristic features described in the embodiments are indispensable to the solution of the invention.

First, a first embodiment will be described. FIG. 1 is a schematic view showing a connection configuration of an image forming system 1a of this embodiment.

In the image forming system 1a, a terminal apparatus (an external apparatus) 211, a DFE (a Digital Front End, an image control apparatus) 201, and an MFP (a Multi-Function Peripheral, an image forming apparatus) 207 are connected to a network 212. Furthermore, the DFE 201 and MFP 207 are connected through a dedicated transfer path 206. In this embodiment, a predetermined transfer path is explained as the dedicated transfer path 206.

The DFE 201 is provided with connectors 202, 203, and 204. The first connector 202 (a first communication member) is an NIC connector that manages connection to the network 212 at a low layer level. The second connector 203 (a second communication member) is an interface for the dedicated transfer path 206. The connector 204 is a connector for the dedicated transfer path through which image data is transmitted to the MFP 207 when the DFE 201 generates the image data. The connector 204 is not used in this embodiment.

The MFP 207 is provided with connectors 208 and 209. The third connector 208 (a third communication member) is a connector for an NIC like Ethernet (registered trademark) that manages connection to the network 212 at the low layer level. The fourth connector 209 (a fourth communication member) is an interface for the dedicated transfer path 206.

The image forming system 1a is characterized in that the DFE 201 and MFP 207 are connected through the dedicated transfer path 206 and that the MFP 207 is connected to the network 212. Print data sent out to the dedicated transfer path 206 through the second connector 203 of the DFE 201 is taken into the MFP 207 through the fourth connector 209. Moreover, the data on the network 212 is taken into the MFP 207 through the third connector 208.

In addition, the fourth connector 209 may be a network interface like Ethernet (registered trademark) and may be connected to the DFE 201 through the network. Alternatively, the fourth connector 209 may be a parallel interface, a USB interface, or the like and may be directly connected to the DFE 201 through an interface cable. Moreover, a plurality of interface cables may be used.

Figure 2:
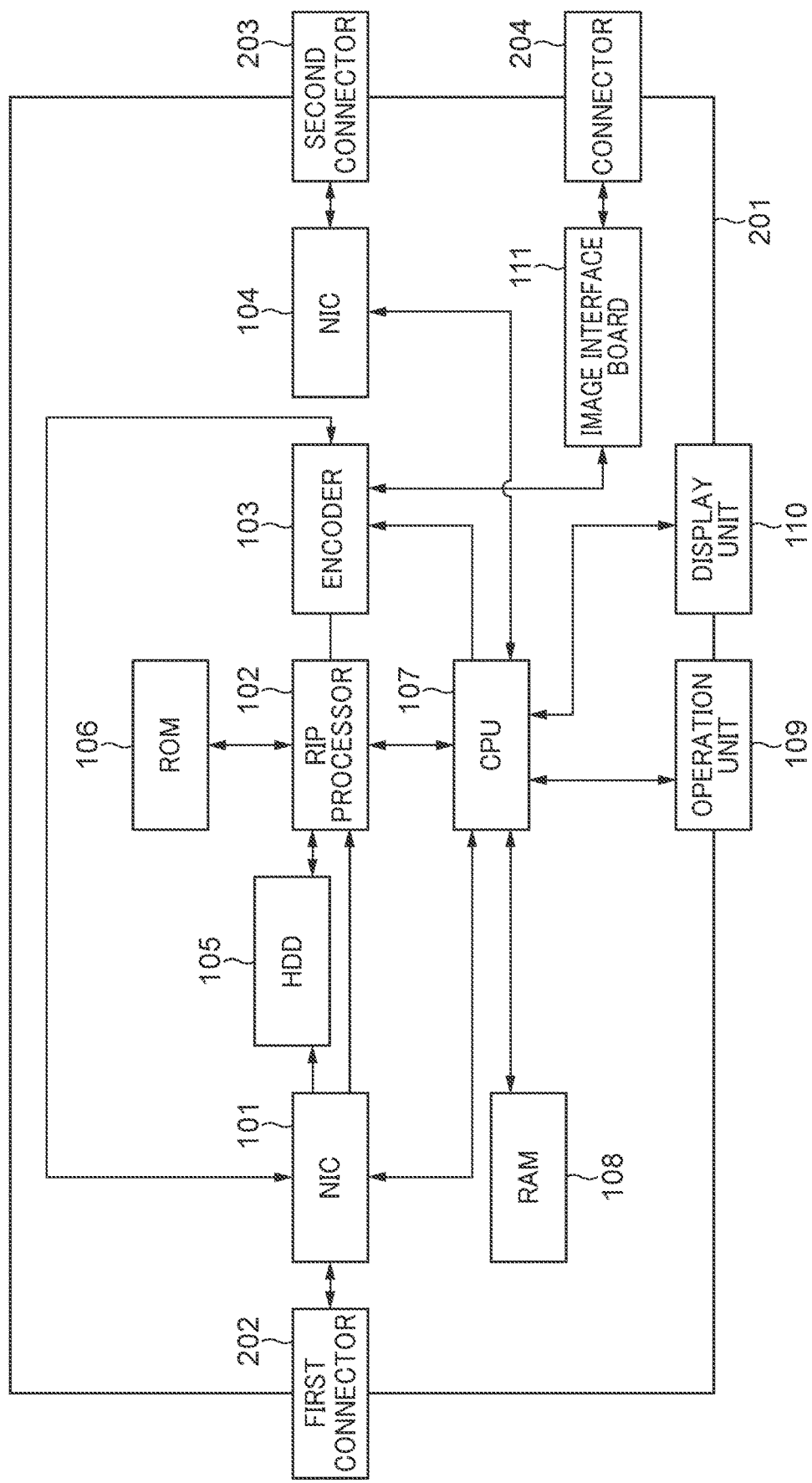
FIG. 2 is a block diagram showing a hardware configuration of a DFE shown in FIG. 1.

FIG. 2 is a block diagram showing a hardware configuration of the DFE 201.

The DFE 201 is provided with NICs 101 and 104, an RIP processor 102, an encoder 103, an HDD 105, a ROM 106, a CPU 107, a RAM 108, an operation unit 109, a display unit 110, and an image interface board 111 in addition to the connectors 202, 203, and 204.

The first connector 202 is connected to the NIC 101. The NIC 101 has a function as a first network interface to manage connection to the network 212 at the low layer level. The RIP processor 102 and HDD 105 are connected to the output side of the NIC 101. The RIP processor 102 has an RIP processing function that rasterizes a print language like PDL or a specific format (compressed by JPEG or JBIG) and compresses it. The HDD 105 is a memory unit that temporarily stores (spools) image data received by the NIC 101 or that temporarily stores image data compressed (rasterized) by the RIP process. The ROM 106 is a memory that the RIP processor 102 uses for an image expansion process.

The image data that is rasterized by the RIP processor 102 is input into the encoder 103. The encoder 103 converts the image into print data in a format or a data format supported by the MFP 207.

Moreover, the DFE 201 is provided with the NIC 104 and image interface board 111. The NIC 104 functions as a second network interface that manages connection at the low layer level. The second connector 203 is used for this interface. Moreover, the data output from the encoder 103 is output to the connector 204 through the image interface board 111 and is transferred to the MFP 207 through the dedicated transfer path 206.

The CPU 107 manages control of the entire DFE 201.

The RAM 108 is a memory unit that the CPU 107 uses as a data temporary storage area.

The operation unit 109 has buttons, keys, etc. and is used to operate the DFE 201.

The display unit 110 consists of a touch panel that notifies a user of information by using an image or a character, and is constituted integrally with the operation unit 109 as an operation panel.

A data packet is transferred from the terminal apparatus 211 to the DFE 201 through the network 212 and is taken into the DFE 201 through the first connector 202. The NIC 101 in the DFE 201 performs a reception process for the data packet. When the data packet received by the NIC 101 is in accordance with TCP/IP protocol, a header information part of the data packet includes the destination port number.

Since the destination port number is information that designates a program or a process of an apparatus that receives the data packet to which data should be transmitted, different port numbers are assigned to respective communication protocols or programs.

For example, destination port numbers to the communication protocols of SNMP (Simple Network Management Protocol), SLP (Service Location Protocol), and WSD (Web Service on Devices) are Port 161, Port 427 and Port 5357, respectively.

Accordingly, when receiving a data packet, the NIC 101 extracts a port number from the header of the received data packet and determines whether the port number corresponds to a print process. Thereby, the NIC 101 is able to determine whether the data packet is print data or other data (control data, for example).

When the NIC 101 determines that the received data packet is print data in this step, the CPU 107 controls to write the received print data received into the HDD 105 if necessary. This is queuing (spooling) that is generally performed in order to improve transfer speed of data packet as print data. The print data stored in the HDD 105 is read by the RIP processor 102 in response to an instruction from the CPU 107. In the meantime, the print data that is not subjected to the queuing is directly transferred to the RIP processor 102 in response to an instruction from the CPU 107.

The RIP processor 102 applies a RIP process to the print data sent to the RIP processor 102. Subsequently, the encoder 103 encodes the print data to a data format that the MFP 207 can interpret on the basis of preset data formats that the MFP 207 can interpret and the format of the received data. Although the data format of the print data sent to the RIP processor 102 may be a preset data format, it is not limited to this. For example, it may be a data format obtained from the MFP 207 by communication or a data format designated through the operation unit 109.

The encoding process is performed if necessary. Accordingly, when the encoding process is unnecessary because a format of received print data can be interpreted by the MFP 207, the encoding process can be skipped. The encoded data needs to be in a format that the MFP can interpret. For example, there are various formats, such as a specific print language format, a data format that compresses by a specific method of JPEG or JBIG. Available formats depend on ability of an interpretation means that is built in the MFP 207. The data encoded as necessary is transferred to the image interface board 111 from the encoder 103. This data passes the connector 204, flows through the dedicated transfer path 206, and is transmitted to the MFP 207 through the fourth connector 209.

Moreover, when the image data scanned by a reader unit 303 (FIG. 3) of the MFP 207 is transmitted to the terminal apparatus 211, the image data as a data packet is sent out to the network 212 through the third connector 208. Thereby, the data packet reaches the terminal 211.

Figure 3:
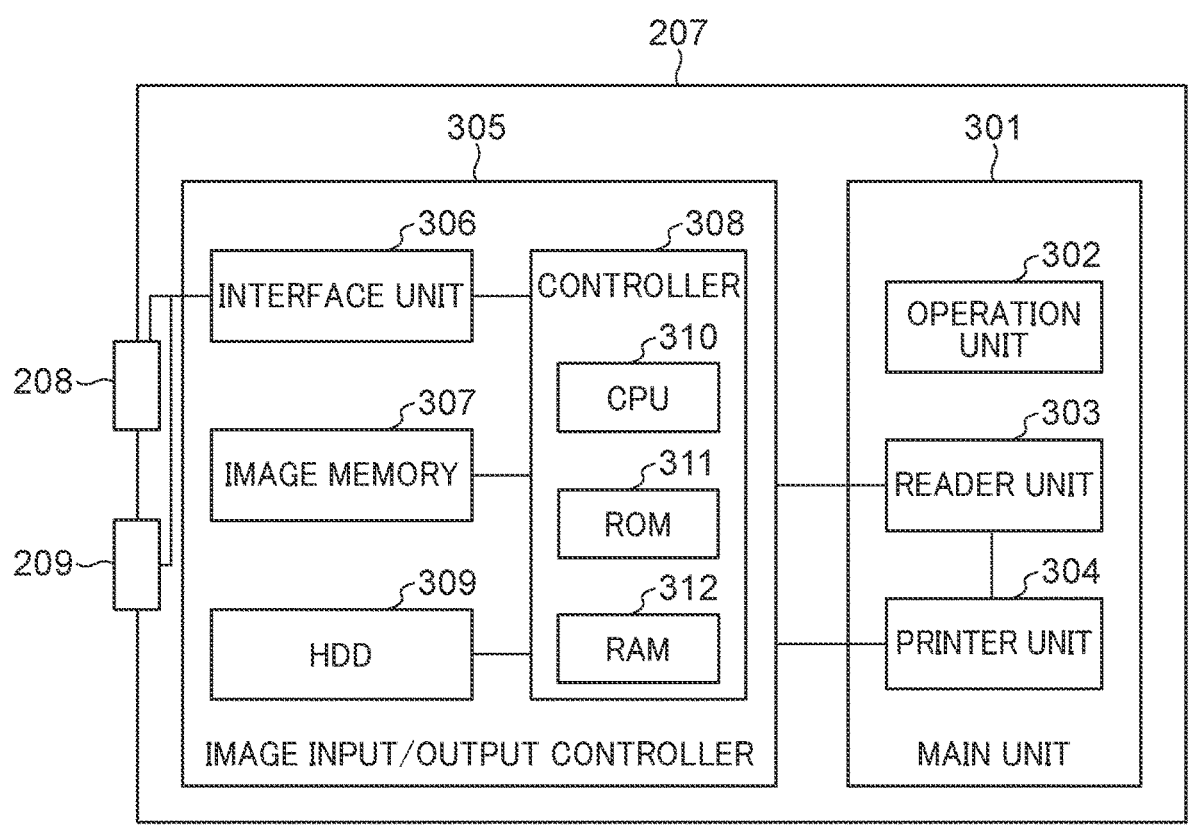
FIG. 3 is a block diagram showing a hardware configuration of an MFP shown in FIG. 1.

FIG. 3 is a block diagram showing a hardware configuration of the MFP 207.

As shown in FIG. 3, the MFP 207 consists of a main unit 301 and an image input/output controller 305.

The main unit 301 consists of an operation unit 302, the reader unit 303, and a printer unit 304.

The operation unit 302 is used to operate the main unit 301 and the image input/output controller 305. A display panel for an operation is integrally attached to the operation unit 302.

The reader unit 303 reads an image of a document and outputs image data corresponding to a document image to the printer unit 304 and image input/output controller 305.

The printer unit 304 records an image corresponding to image data transferred from the reader unit 303 or the image input/output controller 305 onto a recording sheet.

The image input/output controller 305 is connected to the reader unit 303 and consists of an interface (IF) unit 306, an image memory 307, a controller 308, and an HDD 309.

The third connector 208 and fourth connector 209 are connected to the IF unit 306. It should be noted that the HDD 309 stores setting information about the MFP 207, such as an address book, an operation history, a user setting, an ID setting, and a network setting.

The IF unit 306 connects to the third and fourth connectors 208 and 209, and functions as an interface between the DFE 201 and the terminal apparatus 211 on the network 212. For example, the IF unit 306 receives code data representing an image transferred from the DFE 201 through the fourth connector 209, develops the received data to image data that the printer unit 304 can record, and passes it to the controller 308. Moreover, the IF unit 306 receives code data representing image data transferred from the terminal apparatus 211 through the third connector 208. After that, the IF unit 306 develops the data to data that the printer unit 304 can record if necessary and passes it to the controller 308.

The controller 308 is constituted by a CPU 310, a ROM 311, a RAM 312, etc.

The CPU 310 loads a program stored in the ROM 311 or another storage medium onto the RAM 312 and runs it to control flows of data between the reader unit 303, IF unit 306, and image memory 307. The HDD 309 may be replaced with another nonvolatile memory that does not erase data even when power turns off. In such a case, the program is stored in the nonvolatile memory.

The MFP 207 has a function to read a document on the reader unit 303 as image data by the reader unit 303 when an instruction to read the document is received from the terminal apparatus 211. The CPU 310 sends the read image data to the terminal apparatus 211.

In the meantime, unlike the MFP 207, the DFE 201 does not have a reader unit that reads a document. Accordingly, when the DFE 201 is not connected to the MFP 207, the DFE 201 cannot read a document. Accordingly, when the DFE 201 receives an instruction to read a document from the terminal apparatus 211 in the state where the DFE 201 is not connected to the MFP 207, the CPU 107 rejects the instruction.

In the meantime, when the DFE 201 is connected to the MFP 207, the DFE 201 can request the MFP 207 to read a document using the reader unit 303. Accordingly, when the DFE 201 receives an instruction to read a document from the terminal apparatus 211 in the state where the DFE 201 is connected to the MFP 207, the CPU 107 transfers the instruction to the MFP 207. When receiving the transferred instruction, the CPU 310 controls the reader unit 303 to read a document on the reader unit 303 as image data and transmits the read image data to the DFE 201 and the CPU 310 transmits the image data to the terminal apparatus 211.

Subsequently, switching control of network ports of the DFE 201 on the basis of a connection configuration of the MFP 207 of this embodiment will be described using FIG. 4 and FIG. 5.

Figure 4:
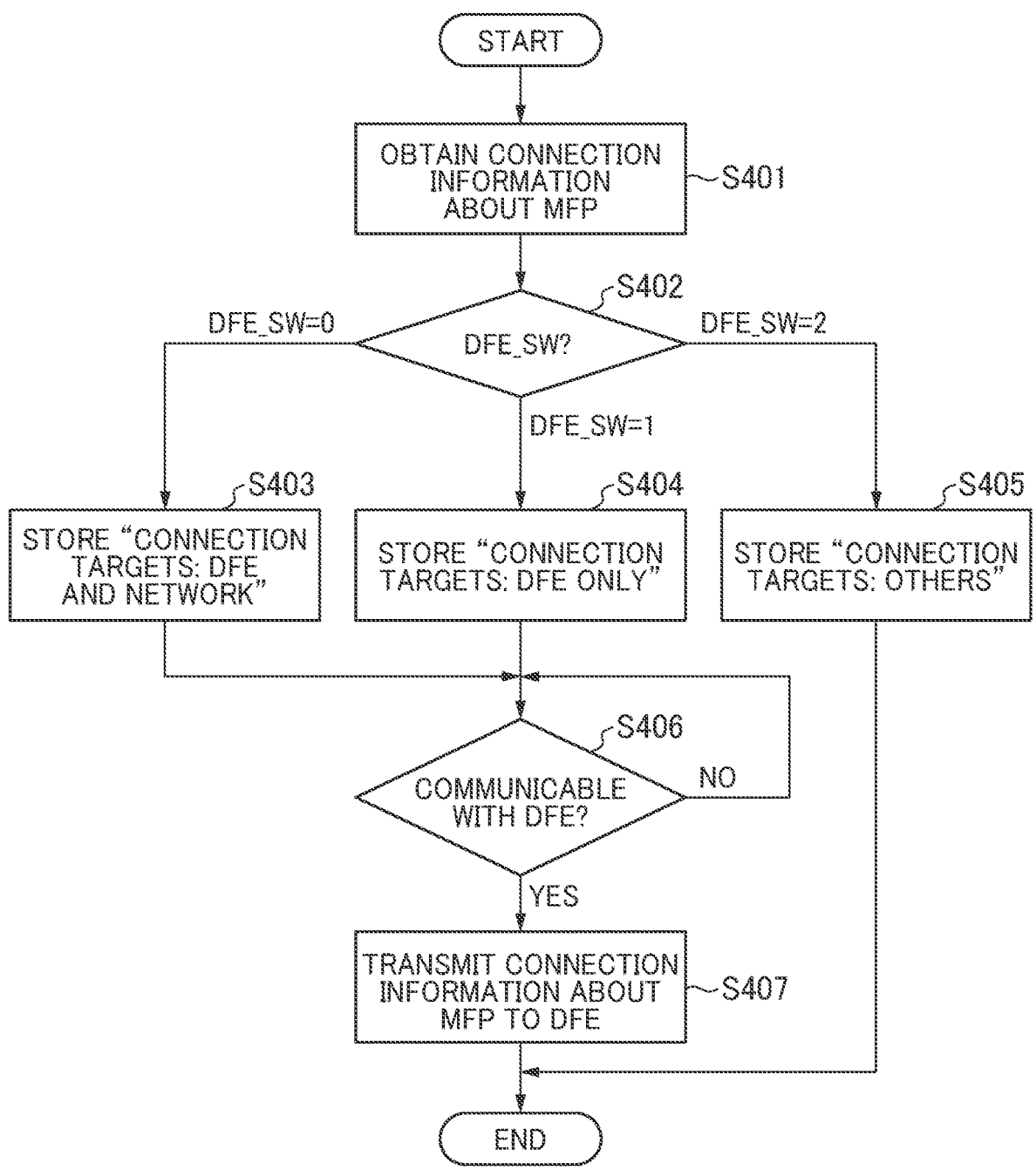
FIG. 4 is a flowchart showing a process for determining a connection configuration of the MFP of the first embodiment executed by the MFP.

FIG. 4 is a flowchart showing a process for determining a connection configuration of the MFP 207 of this embodiment executed by the MFP 207.

The process in FIG. 4 is achieved because the CPU 310 of the MFP 207 reads the program stored in the ROM 311 to the RAM 312 and runs it.

In a step S401, the CPU 310 (an obtainment unit) obtains connection information (information representing a connection configuration) about the MFP 207 and proceeds with the process to a step S402.

The connection information about the MFP 207 is network setting information about the MFP 207 that is input by a user through the operation unit 302 of the MFP 207 and is stored in the RAM 312 of the MFP 207. Hereinafter, a case where the user inputs a value of DFE_SW as the connection information about the MFP 207 will be described. In addition, the connection information about the MFP 207 may be set and held in the HDD 309 of the MFP 207.

In addition, when the MFP 207 is connected to the network 212 through the third connector 208 (the third connector 208 is valid) and the MFP 207 is connected to the DFE 201 through the fourth connector 209 (the fourth connector 209 is valid), the value of DFE_SW is "0". Moreover, when the MFP 207 is not connected to the network 212 through the third connector 208 (the third connector 208 is invalid) but the MFP 207 is connected to the DFE 201 through the fourth connector 209 (the fourth connector 209 is valid), the value of DFE_SW is "1". When the MFP 207 is not connected to the DFE 201 through the fourth connector 209 (the fourth connector 209 is invalid), the value of DFE_SW is 2.

In a step S402, the CPU 310 checks the value of DFE_SW obtained in the step S401. Specifically, when the value of the obtained DFE_SW is "0" (DFE_SW=0 in the step S402), the CPU 310 proceeds with the process to a step S403. Moreover, when the value of the obtained DFE_SW is "1" (DFE_SW=1 in the step S402), the CPU 310 proceeds with the process to a step S404. Moreover, when the value of the obtained DFE_SW is "2" (DFE_SW=2 in the step S402), the CPU 310 proceeds with the process to a step S405.

In the step S403, the CPU 310 stores a connection determination result (connection targets: DFE and network) obtained in the step S402 into the RAM 312 as the connection information about the MFP 207. And then, the CPU 310 proceeds with the process to a step S406.

In the step S404, the CPU 310 stores a connection determination result (connection targets: DFE only) obtained in the step S402 into the RAM 312 as the connection information about the MFP 207. And then, the CPU 310 proceeds with the process to the step S406.

In the step S405, the CPU 310 stores a connection determination result (connection targets: others) obtained in the step S402 into the RAM 312 as the connection information about the MFP 207. And then, the CPU 310 finishes the process as-is.

In the step S406, the CPU 310 determines whether the MFP 207 is communicable with the DFE 201 using the IF unit 306. As a result of the determination, when the MFP 207 is communicable with the DFE 201 (YES in the step S406), the CPU 310 proceeds with the process to a step S407. In the meantime, when the MFP 207 is not communicable with the DFE 201 (NO in the step S406), the CPU 310 returns the process to the step S406.

In the step S407, the CPU 310 sends the connection information about the MFP 207 stored in the RAM 312 to the DFE 201. And then, the CPU 310 finishes this process.

Figure 5:
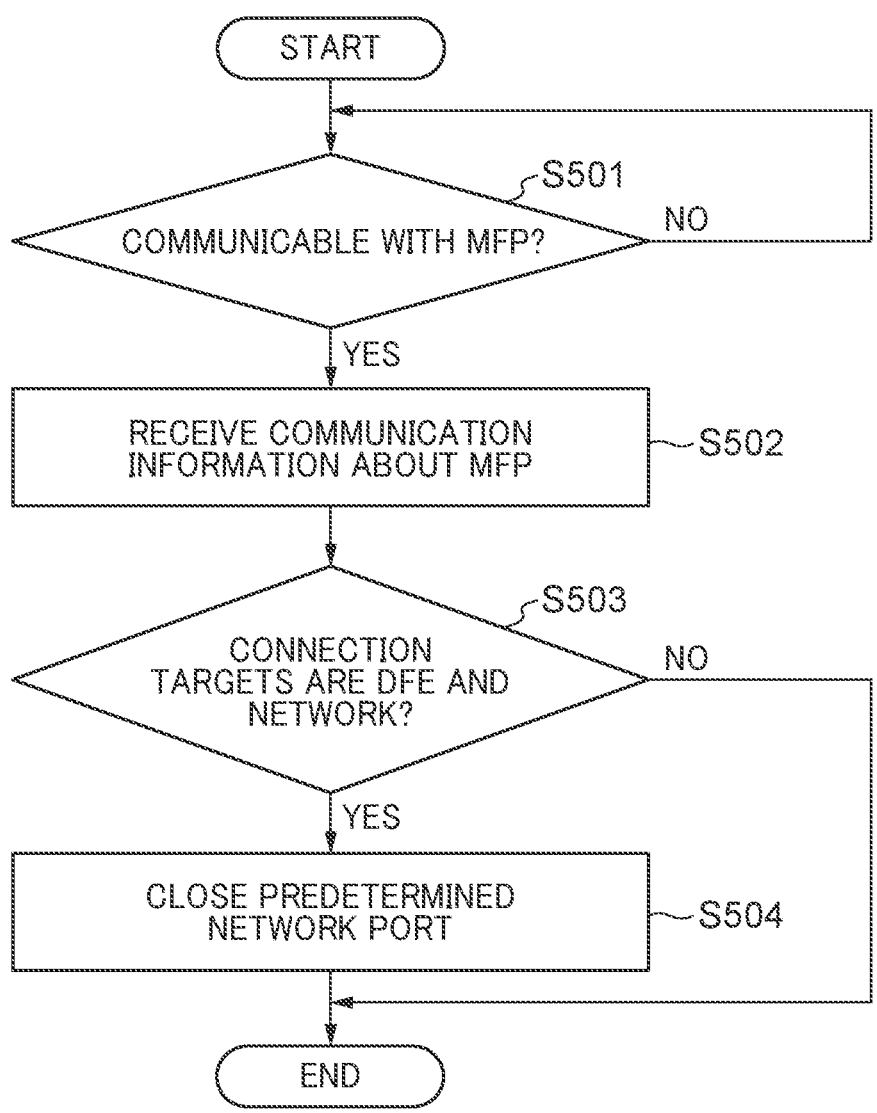
FIG. 5 is a flowchart showing a network-port switching control process of the first embodiment executed by the DFE.

FIG. 5 is a flowchart showing a network-port switching control process of this embodiment executed by the DFE 201

The process in FIG. 5 is achieved because the CPU 107 of the DFE 201 reads the program stored in the ROM 106 to the RAM 108 and runs it.

In a step S501, the CPU 107 determines whether the DFE 201 is communicable with the MFP 207 using the NIC 104. As a result of the determination, when the DFE 201 is communicable with the MFP 207 (YES in the step S501), the CPU 107 proceeds with the process to a step S502. In the meantime, when the DFE 201 is not communicable with the MFP 207 (NO in the step S501), the CPU 310 repeats the process in the step S501.

In the next step S502, the CPU 107 receives the connection information about the MFP 207 from the MFP 207. And then, the CPU 107 proceeds with the process to a step S503.

In the next step S503, the CPU 107 determines whether the connection information about the MFP 207 received in the step S502 shows that the MFP 207 is connected to the DFE 201 and network 212. As a result of the determination, when the received connection information about the MFP 207 shows that the MFP 207 is connected to the DFE 201 and network 212 (YES in the step S503), the CPU 107 proceeds with the process to a step S504. In the meantime, if this is not the case, specifically, when the received connection information about the MFP 207 shows that the MFP 207 is connected to the DFE 201 only (NO in the step S503), the CPU 107 finishes this process as-is. In the step S503, it is enough to determine whether the received connection information about the MFP 207 shows that the MFP 207 is connected to the network 212. That is, it is unnecessary to determine whether the information shows that the MFP 207 is connected to the DFE 201.

In the step S504, the CPU 107 (a port controller) closes a network port (a predetermined network port) of a port number 47545 of the connector 202 of the DFE 201. And then, the CPU 107 finishes this process. In addition, the network port of the port number 47545 of the connector 202 is used when an application of the terminal apparatus 211 communicates with the MFP 207 through the DFE 201.

This prevents a situation where the MFP 207 that is directly connected to the network 212 and the MFP 207 that is indirectly connected to the network 212 through the DFE 201 are found when the application of the terminal apparatus 211 searches the network for an available apparatus. That is, when the network port of the port number 47545 of the first connector 202 is closed, the application of the terminal apparatus 211 cannot find the DFE 201 and can find only the MFP 207 that is directly connected to the network 212. Since this prevents duplicated display of the MFP 207 as a search result by the application of the terminal apparatus 211, the user is not confused.

The MFP 207 may obtain the function for which the application of the terminal apparatus 211 searches. In such a case, the MFP 207 may switch whether to execute the processes in FIG. 4 and FIG. 5 in accordance with the obtained function.

Specifically, only when the function for which the application of the terminal apparatus 211 searches is a function (communication using IPv6 or IPsec, for example) of the MFP 207 that cannot be used through the DFE 201, the processes in FIG. 4 and FIG. 5 may be executed. As a result, when the user wants to use a function of the MFP 207 that cannot be used through the DFE 201, only the MFP 207 directly connected to the network 212 is displayed as a search result by the application of the terminal apparatus 211. Accordingly, the user can certainly select the apparatus that can use the function desired by the user from the search result by the application of the terminal apparatus 211.

In the meantime, when the function for which the application of the terminal apparatus 211 searches is a function (print or scan, for example) of the MFP 207 that can be used through the DFE 201, the processes in FIG. 4 and FIG. 5 may not be executed. Although this cannot prevent the duplicated display of the MFP 207 as the search result by the application of the terminal apparatus 211, the user can select the MFP 207 connected to the DFE 201 when the user wants to use the MFP 207 through the DFE 201.

Moreover, network ports (for example, the port numbers 137, 138, 443, 9100, etc.) of the print function of the DFE 201 that does not use the MFP 207 through DFE 201 are not controlled to close in this embodiment.

Although the CPU 107 controls to close the network port of the port number 47545 of the first connector 202 in the step S504 in this embodiment, the control is not limited to this. For example, the CPU 107 may also close a network port of a port number 8000 that provides Web service of the MFP 207 used by the communication that uses the MFP 207 through the DFE 201 in the step S504.

Moreover, the CPU 107 may control to close a plurality of network ports of the first connector 202 in the step S504. For example, in a conventional system, both of the MFP 207 and the DFE 201 that browses the MFP 207 are displayed on the display unit of the terminal apparatus 211 as a search result of available printers on the network 212 by the printer driver installed in the terminal apparatus 211. In order not to display the DFE 201 as a printer that the printer driver of the terminal apparatus 211 can use, the CPU 107 may control to close the network ports of the port numbers 161 and 427 of the first connector 202 in the step S504.

Although the case where the second connector 203 of the DFE 201 is connected to the fourth connector 209 of the MFP 207 is described in this embodiment, the connection between the MFP 207 and DFE 201 is not limited to this. For example, one of the connectors 202, 203, and 204 of the DFE 201 may be connected to the third connector 208 of the MFP 207.

Moreover, although the MFP 207 is connected to the network 212 through the third connector 208, the connection to the network 212 is not limited to this. For example, when the MFP 207 has a wireless communication unit, the MFP 207 may be connected to the network 212 using the wireless communication unit.

Moreover, the switching control of the network port of the first connector 202 is performed in accordance with the connection configuration between the DFE 201 and MFP 207 in this embodiment. Furthermore, the DFE 201 may control to open and close of the network port by determining communication state of the MFP 207 on the network 212. For example, the case where the communication state of the third connector 208 of the MFP 207 is invalid and the fourth connector 209 of the MFP 207 is communicable with the second connector 203 of the DFE 201 is determined to be equivalent to the connection configuration where only the DFE 201 is connected to the MFP 207. In such a case, the switching control of the network ports of the DFE 201 may be performed as with the case where DFE_SW is "1".

Moreover, although the user inputs the connection information about the MFP 207 through the operation unit 302 of the MFP 207, it may be input through the operation unit 109 of the DFE 201.

Next, a second embodiment will be described. In the first embodiment, the switching control of the network port of the DFE 201 is performed using the connection information about the MFP 207 that the user inputs through the operation unit 302 of the MFP 207 in the step S401. As compared with this, in this embodiment, the switching control of the network port of the DFE 201 is performed using network information that the MFP 207 has.

Hereinafter, a configuration and step in this embodiment that are identical to that in the first embodiment are indicated by the same reference numerals, and a duplicated description is omitted.

Figure 6:
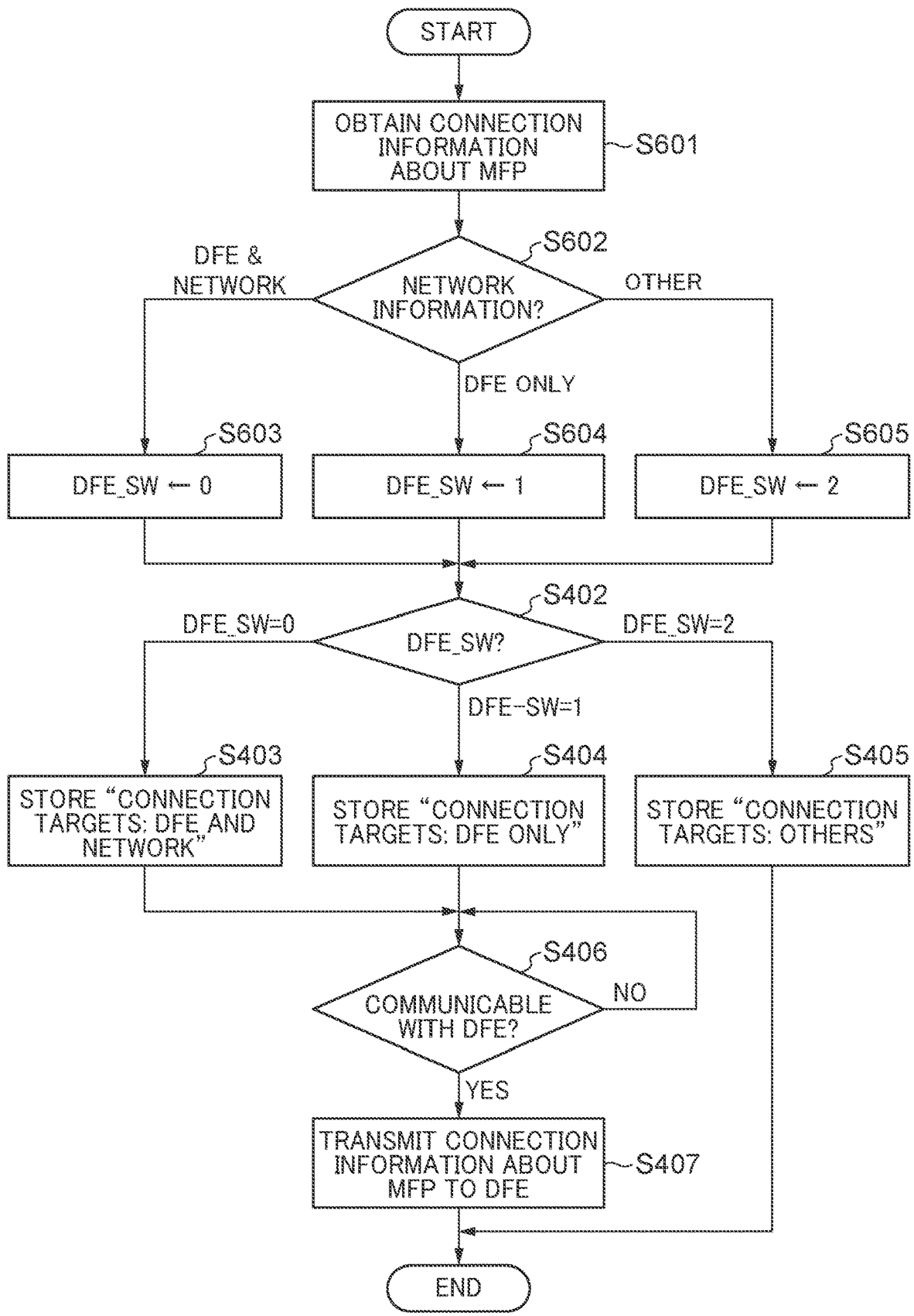
FIG. 6 is a flowchart showing a process for determining a connection configuration of the MFP of a second embodiment executed by the MFP.

FIG. 6 is a flowchart showing a process for determining a connection configuration of the MFP 207 of this embodiment executed by the MFP 207.

The process in FIG. 6 is achieved because the CPU 310 of the MFP 207 reads the program stored in the ROM 311 to the RAM 312 and runs it.

In a step S601, the CPU 310 obtains the network information about the MFP 207 and saves it to the RAM 312. And then, the process proceeds to a step S602.

The network information about the MFP 207 includes network settings of the connectors 280 and 209 of the MFP 207, and specifically, values of a network address and a subnet mask, which are held in the HDD 309 of the MFP 207. It should be noted that the user may input the above-mentioned network information about the MFP 207 using the operation unit 302.

The connection of the MFP 207 and DFE 201 uses a fixed network address. When the network information obtained in the step S601 includes the fixed network address, it is determined that the MFP 207 is connected to the DFE 201. In the meantime, when the network information obtained in the step S601 includes an address other than the fixed network address, it is determined that the MFP 207 is connected to the network 212.

In the step S602, the CPU 310 determines the connection configuration of the MFP 207 using the network information about the MFP 207 held in the RAM 312. When it is determined that the MFP 207 connects to the DFE 201 and network 212 as a result of the determination (DFE and Network in the step S602), the CPU 310 proceeds with the process to a step S603. Moreover, when it is determined that the MFP 207 is connected to only the DFE 201 (Only DFE in the step S62), the CPU 310 proceeds with the process to a step S604. Moreover, when the determination result is "Other" (Other in the step S602), the CPU 310 proceeds with the process to a step S605.

In the step S603, the CPU 310 substitutes "0" for the value of DFE_SW showing a network connection configuration of the MFP 207 and stores it in the RAM 312. And then, the CPU 310 proceeds with the process to the step S402.

In the step S604, the CPU 310 substitutes "1" for the value of DFE_SW showing the network connection configuration of the MFP 207 and stores it in the RAM 312. And then, the CPU 310 proceeds with the process to the step S402.

In the step S605, the CPU 310 substitutes "2" for the value of DFE_SW showing the network connection configuration of the MFP 207 and stores it in the RAM 312. And then, the CPU 310 proceeds with the process to the step S402.

After that, the CPU 310 executes the steps S402 through S407 that have been described by referring to FIG. 4 and finishes this process.

Next, a third embodiment will be described. The first embodiment presupposes that the first connector 202 of the DFE 201 and the third connector 208 of the MFP 207 are connected to the same network 212. As compared with this, this embodiment supposes a case where the first connector 202 of the DFE 201 and the third connector 208 of the MFP 207 are respectively connected to different networks.

Hereinafter, a configuration and step in this embodiment that are identical to that in the first and second embodiments are indicated by the same reference numerals, and a duplicated description is omitted.

Figure 7:
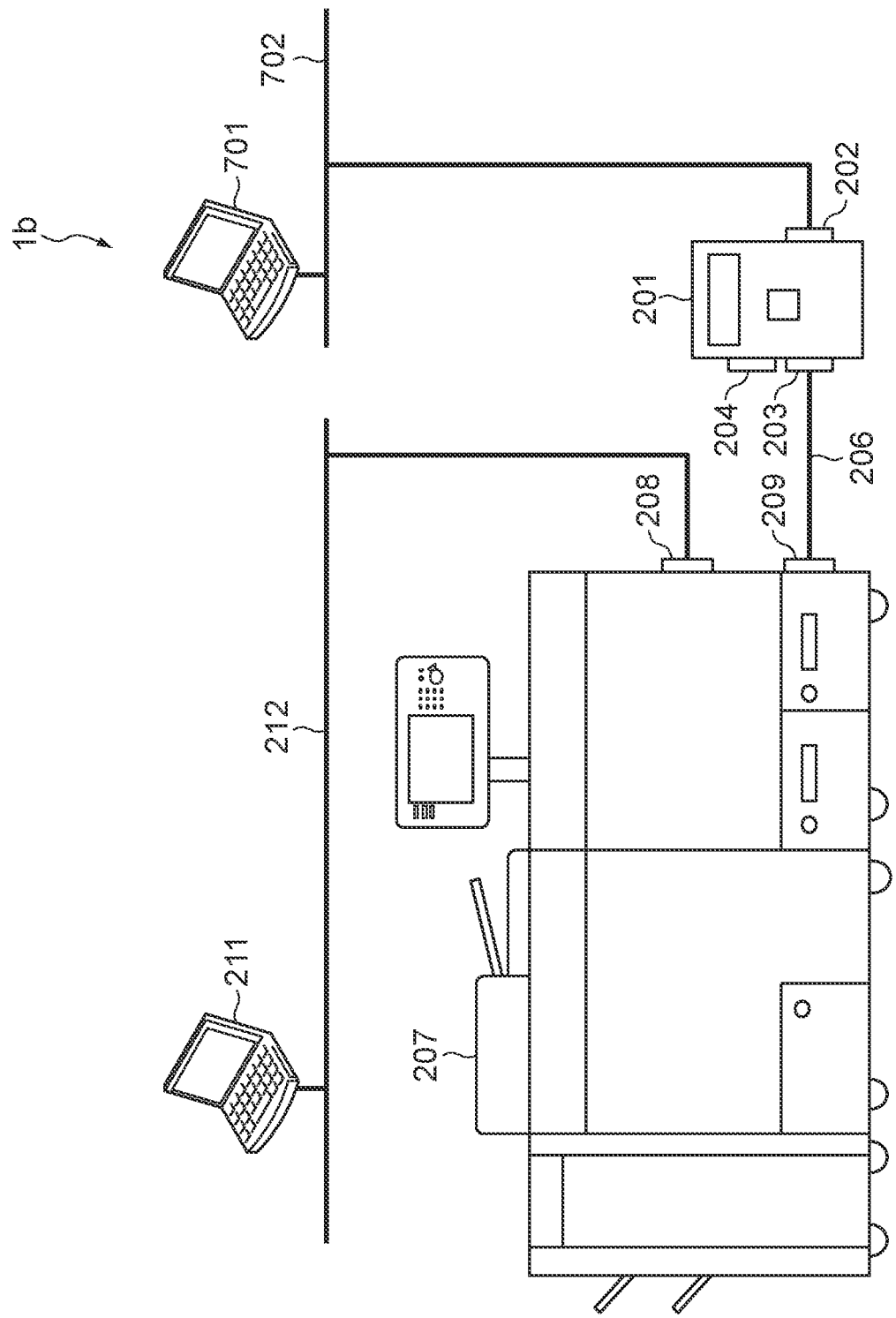
FIG. 7 is a schematic view showing a connection configuration of an image forming system of a third embodiment.

FIG. 7 is a schematic view showing a connection configuration of an image forming system 1*b* of this embodiment.

As shown in FIG. 7, the image forming system 1*b* includes a network 702 that is different from the network 212 in addition to the network 212.

The terminal apparatus 211 and MFP 207 are connected to the network 212, but the DFE 201 is not connected to the network 212. In the meantime, a terminal apparatus 701 and the DFE 201 are connected to the network 702, but the MFP 207 is not connected to the network 702. Moreover, the DFE 201 is connected to the MFP 207 through the dedicated transfer path 206 as with the first embodiment.

The DFE 201 is provided with the connectors 202, 203, and 204. The first connector 202 is an NIC connector that manages the connection to the network 702 at the low layer level. The second connector 203 is an interface for the dedicated transfer path 206. The connector 204 is a connector for the dedicated transfer path through which image data is transmitted to the MFP 207 when the DFE 201 generates the image data. The connector 204 is not used in this embodiment.

The MFP 207 is provided with the connectors 208 and 209. The third connector 208 is a connector for an NIC like Ethernet (registered trademark) that manages connection to the network 212 at the low layer level. The fourth connector 209 is an interface for the dedicated transfer path 206.

The image forming system 1*b* of this embodiment is characterized in that the DFE 201 and MFP 207 are connected through the dedicated transfer path 206 and that the MFP 207 is connected to the network 212. Data on the network 702 is taken into the DFE 201 through the first connector 202. Print data sent out to the dedicated transfer path 206 through the second connector 203 of the DFE 201 is taken into the MFP 207 through the fourth connector 209.

Although the case where the second connector 203 of the DFE 201 is connected to the fourth connector 209 of the MFP 207 is described in this embodiment, the connection between the MFP 207 and DFE 201 is not limited to this. For example, the second connector 203 of the DFE 201 may be connected to the third connector 208 of the MFP 207. In this case, the fourth connector 209 of the MFP 207 is connected to the network 212.

Subsequently, switching control of network ports of the DFE 201 on the basis of the connection configuration of the MFP 207 of this embodiment will be described using FIG. 8. Since the network-port switching control process executed by the DFE 201 is the same as that of the first embodiment in FIG. 5, its description is omitted.

Figure 8:
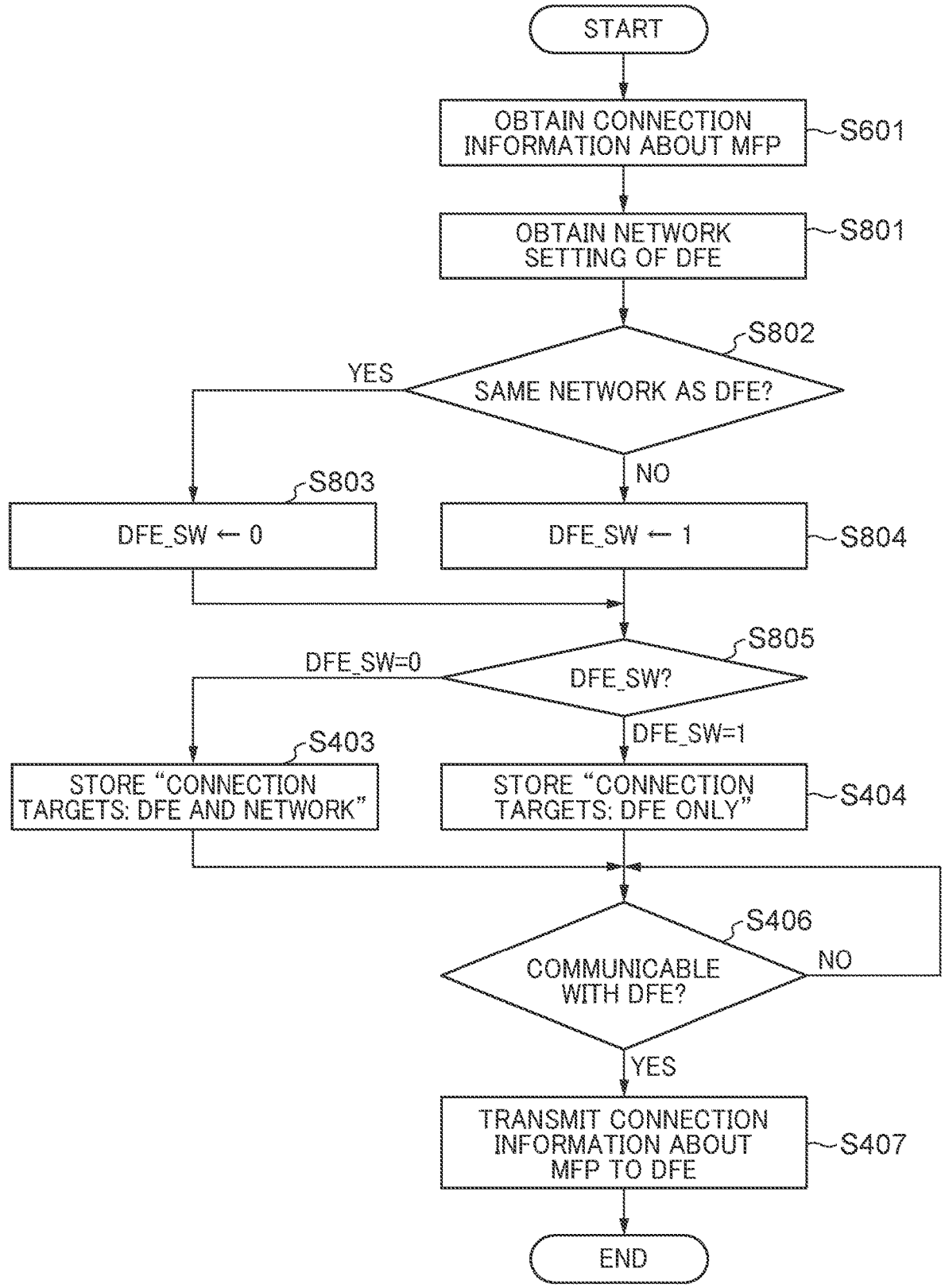
FIG. 8 is a flowchart showing a process for determining a connection configuration of the MFP of the third embodiment executed by the MFP.

FIG. 8 is a flowchart showing a process for determining a connection configuration of the MFP 207 of this embodiment executed by the MFP 207.

The process in FIG. 8 is achieved because the CPU 310 of the MFP 207 reads the program stored in the ROM 311 to the RAM 312 and runs it.

In a step S601, the CPU 310 obtains the network information about the MFP 207 and saves it to the RAM 312. And then, the process proceeds to a step S801.

The network information about the MFP 207 includes values of a network address and a subnet mask set to the third connector 208 of the MFP 207, which are held in the HDD 309 of the MFP 207.

In the step S801, the CPU 310 obtains the network information about the DFE 201 and saves it to the RAM 312. And then, the process proceeds to a step S802.

The network information about the DFE 201 includes values of a network address and subnet mask set to the first connector 202 of the DFE 201 that are included in MIB held in the HDD 309 of the DFE 201.

In the step S802, the CPU 310 determines whether the MFP 207 and DFE 201 are connected to the same network by comparing the network information about the MFP 207 with the network information about the DFE 201 that are held in the RAM 312. Specifically, the CPU 310 reads the values of the network address and subnet mask set to the third connector 208 of the MFP 207 that are stored in the RAM 312 in the step S601, and obtain the network information about the MFP 207 from a logical product of them. Similarly, the CPU 310 reads the values of the network address and subnet mask set to the first connector 202 of the DFE 201 that are stored in the RAM 312 in the step S801, and obtains the network information about the DFE 201 from a logical product of them. After that, the CPU 3107 compares the obtained network information about the MFP 207 with the obtained network information about the DFE 201.

When the compared values of the network information about the MFP 207 and DFE 201 are identical, the CPU 310 determines that the MFP 207 and DFE 201 are connected to the same network (YES in the step S802) as shown in FIG. 1 and proceeds with the process to a step S803. In the meantime, when the compared values of the network information about the MFP 207 and DFE 201 are different, the CPU 310 determines that the MFP 207 and DFE 201 are respectively connected to the different networks (NO in the step S802) as shown in FIG. 7 and proceeds with the process to a step S804.

A case where the MFP 207 and DFE 201 are connected to the same network is equivalent to the case where the value of DFE_SW of the network connection configuration as shown in FIG. 1 is "0". Accordingly, in the step S803, the CPU 310 substitutes "0" for the value of DFE_SW showing the network connection configuration of the MFP 207 and stores it as the connection information about the MFP 207 in the RAM 312. And then, the CPU 310 proceeds with the process to a step S805.

Moreover, the case where the MFP 207 and DFE 201 are connected to the different networks as shown in FIG. 7 is equivalent to the connection configuration where the MFP 207 is connected to only the DFE 201 when viewed from the terminal apparatus 701 because the third connector 208 of the MFP 207 is not communicable with the first connector 202 of the DFE 201. Accordingly, in the step S804, the CPU 310 substitutes "1" for the value of DFE_SW showing the network connection configuration of the MFP 207 and stores it as the connection information about the MFP 207 in the RAM 312. And then, the CPU 310 proceeds with the process to the step S805.

In the step S805, the CPU 310 determines the connection configuration of the MFP 207 using the value of DFE_SW held in the RAM 312 in the last step (the step S803 or S804). Specifically, when the value of DFE_SW held in the RAM 312 is "0" (DFE_SW=0 in the step S805), the CPU 310 proceeds with the process to the step S403. In the meantime, when the value of DFE_SW held in the RAM 312 is "1" (DFE_SW=1 in the step S805), the CPU 310 proceeds with the process to the step S404.

After that, the CPU 310 executes the steps S403, S404, S406, and S407 that have been described by referring to FIG. 4 and finishes this process.

As mentioned above, in this embodiment, when the DFE 201 and MFP 207 are connected to the same network (for example, the network 212), the network port of the port number 47545 of the first connector 202 of the DFE 201 is controlled to close.

In the meantime, when the MFP 207 and DFE 201 are respectively connected to the different networks 212 and 702, the network port of the port number 47545 of the first connector 202 of the DFE 201 is controlled to keep opening without closing. Thereby, the user is able to use the function of the MFP 207 on both of the different networks.

Although the switching control of a port of the first connector 202 of the DFE 201 is described in this embodiment, a port to be controlled is not limited to this. Switching of a plurality of ports of the first connector 202 of the DFE 201 may be controlled.

Next, a fourth embodiment will be described. In the first embodiment, the MFP 207 determines the connection configuration of the MFP 207 and sends the connection information to the DFE 201. Then, the DFE 201 controls the switching of the network port of the first connector 202 of the DFE 201 using the connection information received from the MFP 207. As compared with this, in this embodiment, the DFE 201 determines whether the MFP 207 and DFE 201 are connected to the same network and controls the switching of the network port of the first connector 202 of the DFE 201 using the determination result.

Hereinafter, a configuration in this embodiment that is identical to that in the first embodiment is indicated by the same reference numeral, and a duplicated description is omitted.

Figure 9:
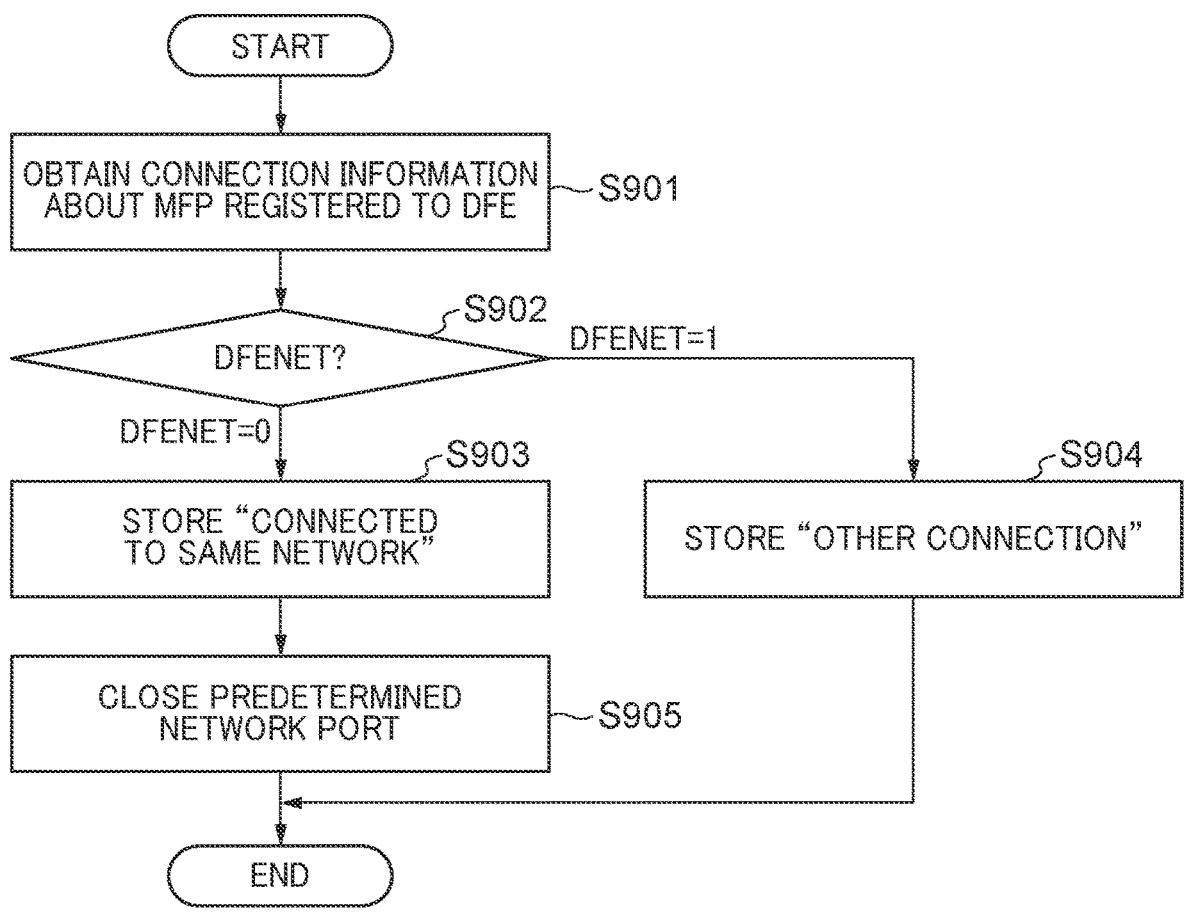
FIG. 9 is a flowchart showing a network-port switching control process of a fourth embodiment executed by the DFE.

FIG. 9 is a flowchart showing a network-port switching control process of this embodiment executed by the DFE 201.

The process in FIG. 9 is achieved because the CPU 107 of the DFE 201 reads the program stored in the ROM 106 to the RAM 108 and runs it.

In a step S901, the CPU 107 receives the connection information about the DFE 201. And then, the CPU 107 proceeds with the process to a step S902.

The connection information about the DFE 201 includes values showing network settings of the connectors 202 and 208 that are input through the operation unit 109 of the DFE 201 and are stored in the RAM 108. Hereinafter, a case where the user inputs a value (DFENET) showing whether both of the DFE 201 (the first connector 202) and the MFP 207 (the third connector 208) are connected to the network 212 as the connection information about the DFE 201 will be described. When the connection configuration shows that both of the DFE 201 and MFP 207 are connected to the network 212, the value of DFENET is set to "0". When the DFE 201 and MFP 207 are in another connection configuration, the value of DFENET is set to "1".

In the step S902, the CPU 310 checks the value of DFENET obtained in the step S901. Specifically, when the value of DFENET is "0" (DFENET=0 in the step S902), the CPU 310 proceeds with the process to a step S903. In the meantime, when the value of the DFENET is "1" (DFENET=1 in the step S902), the CPU 310 proceeds with the process to a step S904.

In the step S903, the CPU 107 stores "connected to same network" in the RAM 108 as the connection configuration of the DFE 201 and MFP 207. And then, the CPU 107 proceeds with the process to a step S905.

In the step S904, the CPU 107 stores "other connection" in the RAM 108 as the connection configuration of the DFE 201 and MFP 207. And then, the CPU 107 finishes this process. In this case, the network port of the port number 47545 of the first connector 202 of the DFE 201 is controlled to keep opening.

In the step S905, the CPU 107 closes the network port of the port number 47545 of the first connector 202 of the DFE 201. And then, the CPU 107 finishes this process.

Next, a fifth embodiment will be described. In the fourth embodiment, the switching of the network port of the first connector 202 of the DFE 201 is controlled using the connection information about the DFE 201 input by the user through the operation unit 302 of the DFE 201. As compared with this, in this embodiment, it is determined whether the DFE 201 and MFP 207 are connected to the same network using the network information held by the DFE 201 holds and the network information obtained from the MFP 207, and the switching of the network port of the first connector 202 of the DFE 201 is controlled.

Hereinafter, a configuration in this embodiment that is identical to that in the fourth embodiment is indicated by the same reference numeral, and a duplicated description is omitted.

Figure 10:
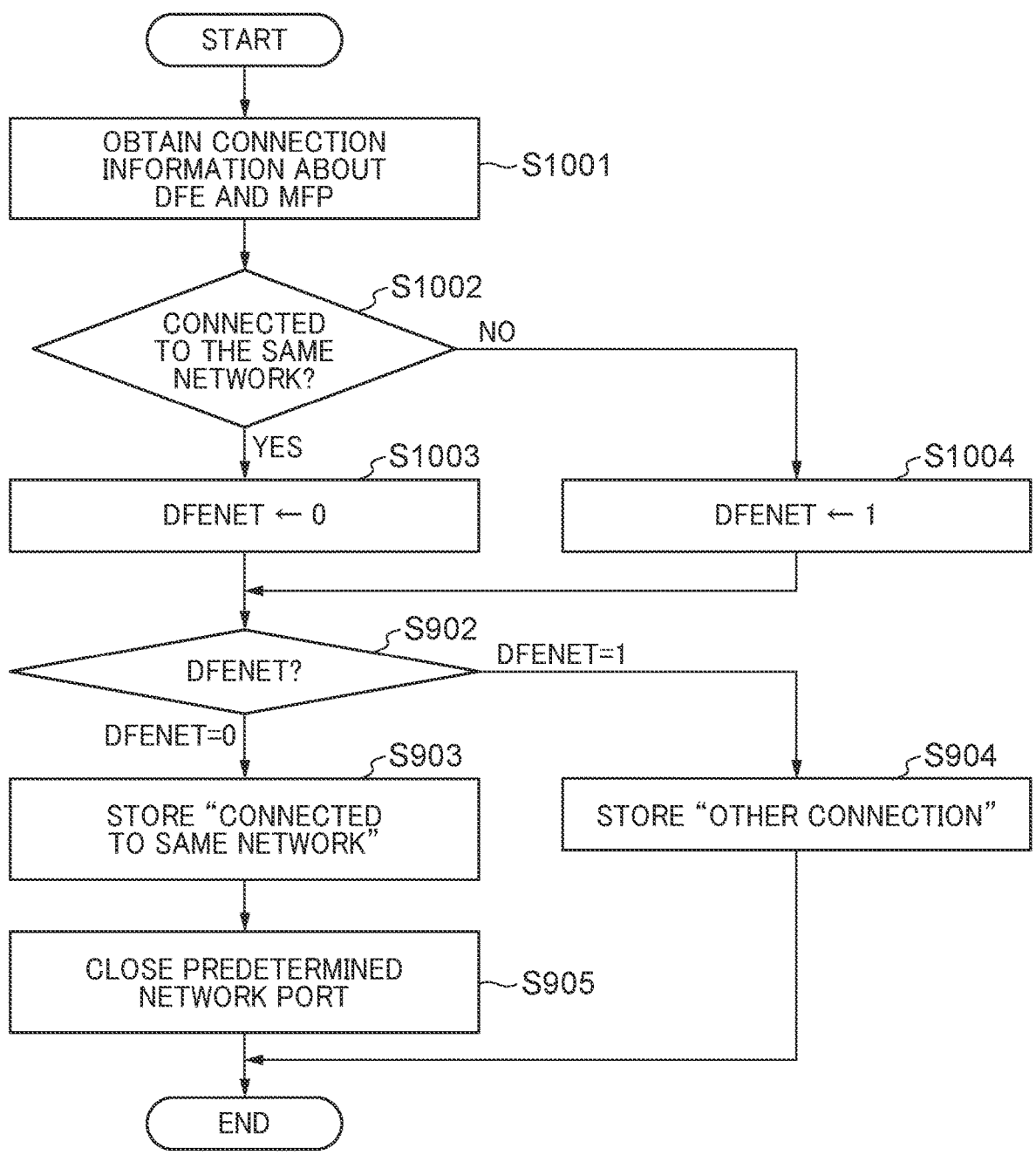
FIG. 10 is a flowchart showing a network-port switching control process of a fifth embodiment executed by the DFE.

FIG. 10 is a flowchart showing a network-port switching control process of this embodiment executed by the DFE 201

The process in FIG. 10 is achieved because the CPU 107 of the DFE 201 reads the program stored in the ROM 106 to the RAM 108 and runs it.

In a step S1001, the CPU 107 obtains the connection information about the DFE 201 and MFP 207. Specifically, the CPU 107 obtains values of a network address and subnet mask of the first connector 202 of the DFE 201 that are stored in the HDD 105 of the DFE 201 as the connection information about the DFE 201. Moreover, the CPU 107 obtains values of a network address and subnet mask of the third connector 208 of the MFP 207 included in the MIB held in the HDD 309 of the MFP 207 as the connection information about the MFP 207. After that, the CPU 107 proceeds with the process to a step S1002.

In the step S1002, the CPU 107 determines whether the MFP 207 and DFE 201 are connected to the same network on the basis of the connection information about the DFE 201 and MFP 207 obtained in the step S1001. Specifically, the CPU 107 obtains the network information about the DFE 201 from the logical product of the network address and subnet mask of the first connector 202 of the DFE 201 obtained in the step S1001, Similarly, the CPU 107 obtains the network information about the MFP 207 from the logical product of the network address and subnet mask of the third connector 208 of the MFP 207 obtained in the step S1001. After that, the CPU 3107 compares the obtained network information about the MFP 207 with the obtained network information about the DFE 201.

When the compared values of the network information about the MFP 207 and DFE 201 are identical, the CPU 310 determines that the MFP 207 and DFE 201 are connected to the same network (YES in the step S1002) and proceeds with the process to a step S1003. In the meantime, when the compared values of the network information about the MFP 207 and DFE 201 are different, the CPU 310 determines that the connection configuration of the MFP 207 and DFE 201 is another connection configuration (NO in the step S1002) and proceeds with the process to a step S1004. For example, when the DFE 201 is not connected to the MFP 207 or when the DFE 201 and MFP 207 are respectively connected to different networks, the CPU 310 determines that it is another connection configuration.

In the step S1003, the CPU 107 substitutes the value "0" showing that the DFE 201 and MFP 207 are connected to the network 212 for DFENET and stores it in the RAM 108. Then, the CPU 1007 proceeds with the process to the step S902.

In the step S1004, the CPU 107 substitutes the value "1" showing the connection configuration other than the configuration where the DFE 201 and MFP 207 are connected to the network 212 for DFENET and stores it in the RAM 108. Then, the CPU 1007 proceeds with the process to the step S902.

In the next step S902, the CPU 107 checks the value of DFENET obtained in the last step (step S1003 or step S1004). Specifically, when the value of DFENET is "0" (DFENET=0 in the step S902), the CPU 310 proceeds with the process to a step S903. In the meantime, when the value of the DFENET is "1" (DFENET=1 in the step S902), the CPU 310 proceeds with the process to a step S904.

After that, the CPU 310 executes the steps S903 through S905 that have been described by referring to FIG. 9 and finishes this process.

Other Embodiments

Embodiment(s) of the present invention can also be realized by a computer of a system or apparatus that reads out and executes computer executable instructions (e.g., one or more programs) recorded on a storage medium (which may also be referred to more fully as a ('non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-183415, filed Nov. 10, 2021, which is hereby incorporated by reference herein in its entirety.

What is claimed is:

1. An image forming system comprising:
   an image forming apparatus; and
   an image control apparatus comprising:
   a first communication member configured to be connected to an external apparatus through a network;
   a second communication member configured to be connected to the image forming apparatus through a predetermined transfer path; and
   a port controller configured to control switching of a predetermined network port of the first communication member; and
   wherein the image forming apparatus comprises:
   a third communication member configured to be connected to the external apparatus through the network; and
   a fourth communication member configured to be connected to the image control apparatus through the predetermined transfer path,
   wherein the port controller:
   closes the predetermined network port in a state where the first and third communication members are connected to a same network; and
   opens the predetermined network port in a state where the first and third communication members are respectively connected to different networks.

2. The image forming system according to claim 1, wherein:
   the image forming apparatus further comprises a controller, including one or more processors and one or more memories, configured to obtain a connection configuration of the image forming apparatus and a connection configuration of the image control apparatus, and
   the port controller determines whether the first and third communication members are connected to the same network using the connection configuration of the image forming apparatus and the connection configuration of the image control apparatus.

3. The image forming system according to claim 1, wherein:
   the image control apparatus further comprises a controller, including one or more processors and one or more memories, configured to obtain a connection configuration of the image forming apparatus and a connection configuration of the image control apparatus, and
   the port controller determines whether the first and third communication members are connected to the same network using the connection configuration of the image forming apparatus and the connection configuration of the image control apparatus.

4. The image forming system according to claim 3, wherein the connection configuration of the image forming apparatus and the connection configuration of the image control apparatus are set and held in the image control apparatus.

5. The image forming system according to claim 3, wherein the connection configuration of the image forming apparatus and the connection configuration of the image control apparatus are input through an operation unit of the image control apparatus.

6. The image forming system according to claim 3, wherein the controller is configured to determine the connection configuration of the image forming apparatus and the connection configuration of the image control apparatus using network settings of the image control apparatus and the image forming apparatus.

7. An image control apparatus comprising:
   a first communication member configured to be connected to an external apparatus through a network;
   a second communication member configured to be connected to an image forming apparatus through a predetermined transfer path; and
   a port controller configured to control switching of a predetermined network port of the first communication member,
   wherein the port controller:
   closes the predetermined network port in a state where the first communication member and a third communication member, which is provided in the image forming apparatus and configured to be connected to the external apparatus through the network, are connected to a same network; and
   opens the predetermined network port in a state where the first and third communication members are respectively connected to different networks.

8. A control method for an image forming system including an image control apparatus that includes first and second connectors and an image forming apparatus that includes third and fourth connectors, the control method comprising:
   connecting the image control apparatus to an external apparatus through a network using the first connector;
   connecting the image control apparatus to the image forming apparatus through a predetermined transfer path using the second connector;
   connecting the image forming apparatus to the external apparatus through the network using the third connector;
   connecting the image forming apparatus to the image control apparatus through the predetermined transfer path using the fourth connector;
   closing a predetermined network port of the first connector in a state where the first and third connectors are connected to a same network; and
   opening the predetermined network port in a state where the first and third connectors are respectively connected to different networks.

9. A control method for an image control apparatus that includes first and second connectors, the control method comprising:

connecting the image control apparatus to an external apparatus through a network using the first connector;
connecting the image control apparatus to an image forming apparatus through a predetermined transfer path using the second connector;
closing a predetermined network port of the first connector in a state where the first connector and a third connector, which is provided in the image forming apparatus to be connected to the external apparatus through the network, are connected to a same network; and
opening the predetermined network port in a state where the first and third connectors are respectively connected to different networks.

10. An image forming system comprising:
an image forming apparatus; and
an image control apparatus comprising:
   a first communication member configured to be connected to an external apparatus through a network;
   a second communication member configured to be connected to the image forming apparatus through a predetermined transfer path; and
   a port controller configured to control switching of a predetermined network port of the first communication member; and
wherein the image forming apparatus comprises:
   a third communication member configured to be connected to the external apparatus through the network; and
   a fourth communication member configured to be connected to the image control apparatus through the predetermined transfer path,
wherein the port controller opens the predetermined network port in a state where the first and third communication members are respectively connected to different networks.

* * * * *